United States Patent
Ogino

(10) Patent No.: US 6,862,140 B2
(45) Date of Patent: Mar. 1, 2005

(54) STEREOSCOPIC IMAGE PICKUP SYSTEM

(75) Inventor: Shigeru Ogino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 09/772,002

(22) Filed: Jan. 30, 2001

(65) Prior Publication Data

US 2001/0019450 A1 Sep. 6, 2001

(30) Foreign Application Priority Data

Feb. 1, 2000 (JP) ........................................ 2000-023864

(51) Int. Cl.$^7$ ............................................. G02B 27/22
(52) U.S. Cl. ..................... 359/473; 359/462; 396/331; 348/49
(58) Field of Search ................................ 359/462, 473, 359/407, 411, 412; 396/331; 348/49, 343; 369/112.02

(56) References Cited

U.S. PATENT DOCUMENTS

| | | | | |
|---|---|---|---|---|
| 3,251,933 A | * | 5/1966 | Beste | 348/49 |
| 3,670,097 A | * | 6/1972 | Jones | 348/49 |
| 5,028,994 A | * | 7/1991 | Miyakawa et al. | 348/42 |
| 5,671,450 A | * | 9/1997 | Suzuki | 396/227 |
| 5,835,133 A | * | 11/1998 | Moreton et al. | 348/49 |
| 6,061,179 A | | 5/2000 | Inoguchi et al. | |
| 6,414,791 B1 | * | 7/2002 | Sugawara | 359/497 |

FOREIGN PATENT DOCUMENTS

| | | | |
|---|---|---|---|
| EP | 0 788 008 | 8/1997 | |
| JP | 1-147444 | 6/1989 | |
| JP | 8-027499 | 3/1996 | |
| JP | 9-311294 | 12/1997 | |
| JP | 9-311295 | 12/1997 | |
| JP | 9-318911 | 12/1997 | |
| JP | 2000019663 A | * 1/2000 | ........... G03B/35/08 |

* cited by examiner

Primary Examiner—Audrey Chang
Assistant Examiner—Denise S. Allen
(74) Attorney, Agent, or Firm—Fitzpatrick, Cella, Harper & Scinto

(57) ABSTRACT

A stereoscopic image pickup system for obtaining parallactic images includes a pair of front optical components, the pair of front optical components respectively including a pair of reflecting members capable of rotating around respective predetermined axes and having a reflecting function, and a pair of amount-of-light control members arranged to respectively vary amounts of transmission of light fluxes coming from the pair of reflecting members alternately in a time-series manner, an optical member arranged to superpose respective optical axes of the pair of front optical components on each other, a rear optical component having an optical axis coinciding with the superposed optical axes of the pair of front optical components and having a magnification varying function, and a controller for controlling an amount of parallax of parallactic images by using the pair of reflecting members in accordance with a magnification varying operation of the rear optical component.

15 Claims, 6 Drawing Sheets fj : FOCAL LENGTH OF LIGHT-RECEIVING LENS
B : BASE LINE LENGTH

STEREOSCOPIC IMAGE PICKUP SYSTEM

BACKGROUND OF THE INVENTION

1. Field of the Invention

The present invention relates to a stereoscopic image photographing optical system and a stereoscopic image photographing apparatus having the optical system, which are adapted to obtain a stereoscopic image by leading images having parallax for right and left eyes (parallactic images) alternately in a time-series manner to one image sensor with shutter means.

2. Description of Related Art

In recent years, there have been proposed a variety of stereoscopic image display apparatuses for observing stereoscopic images. For example, there is known a stereoscopic image display apparatus in which right and left parallactic images are displayed on a monitor and are observed by the observer with liquid-crystal shutter spectacles. In such a stereoscopic image display apparatus, the states of right and left liquid crystal elements of the liquid-crystal shutter spectacles are synchronized with an image signal. More specifically, during the period when an image for the right eye is being displayed on the monitor, the liquid crystal element for the right eye is set to a transmissive state and the liquid crystal element for the left eye is set to a non-transmissive state, while, during the period when an image for the left eye is being displayed on the monitor, the liquid crystal element for the right eye is set to a non-transmissive state and the liquid crystal element for the left eye is set to a transmissive state. By this arrangement, when an image for the right eye and an image for the left eye are alternately displayed on the monitor, the observer is enabled to view an image for the right eye always with the right eye and an image for the left eye always with the left eye. Accordingly, a stereoscopic image giving a sensation of depth is observed by the observer.

Further, in recent years, a display of the head-mounted type or the spectacle type, i.e., the so-called head-mounted display, has been developed. In the head-mounted display, too, images for the right eye and for the left eye are selectively displayed for the right eye and the left eye, respectively, so that the observer is enabled to view a stereoscopic image giving a sensation of depth.

In addition, there has been proposed, in Japanese Laid-Open Patent Applications No. Hei 9-311294, No. Hei 9-311295, No. Hei 9-318911 (corresponding to U.S. Pat. No. 6,061,179), etc., a stereoscopic image observing apparatus in which a liquid crystal display is combined with a lenticular sheet having minute lenses of a predetermined pitch or with a mask having a predetermined pattern of aperture parts and non-aperture parts. In such a stereoscopic image observing apparatus, light beams from the liquid crystal display are made to have directivity, and the directivity is made to match with an image pattern displayed on the liquid crystal display, so that an image for the right eye is observed with the right eye and an image for the left eye is observed with the left eye, thereby enabling the observer to view a stereoscopic image giving a sensation of depth.

In order to observe a stereoscopic image, it is necessary to produce a plurality of parallactic images. Heretofore, there have been proposed a variety of stereoscopic image photographing optical apparatuses or stereoscopic image photographing optical systems for obtaining a plurality of parallactic images.

Heretofore, in the above-mentioned stereoscopic image photographing apparatus, it is general that a plurality of parallactic images to be displayed are picked up by the twin-lens type stereoscopic camera having two lenses (photographic lenses).

In addition, there has been proposed a camera which does not require two photographic lenses (a photographing apparatus for stereoscopic television disclosed in Japanese Patent Publication No. Hei 8-27499). This camera has two liquid-crystal shutters, a total-reflection mirror and a half-reflection mirror, and is arranged to pick up right and left parallactic images alternately through one photographic lens.

Further, in the case of the twin-lens type stereoscopic camera, the so-called convergence adjustment for adjusting the parallax of right and left parallactic images during photographing is required for the photographic lenses for time-divisionally picking up right and left parallactic images. Heretofore, in general, the convergence adjustment is performed manually.

Since, in the case of the above-mentioned conventional twin-lens type stereoscopic camera serving as an apparatus for obtaining parallactic images for the right eye and the left eye, an image for the right eye and an image for the left eye are picked up for the respective photographic lenses, if the difference between the two photographic lenses in optical performance, such as magnification, deviation of an optical axis, color, brightness, distortion, field tilt or the like, occurs due to the manufacturing error of photographic lenses, the observer tends to feel tired in viewing a stereoscopic image, or two images tend to be unable to fuse with each other. Accordingly, it is necessary to heighten the accuracy of parts so as to match the optical performance of one lens with that of the other lens, or it is necessary to make the adjustment of parts if the increased accuracy of parts is still insufficient for optical performance. Further, in order to absorb the difference in optical performance, it is necessary to take special measures, such as an electrical correction of images.

Further, in a case where zoom lenses are used as the photographic lenses, the magnification varying actions of two, right and left, photographic lenses are required to interlock with each other during zooming with the optical performance of each lens adjusted. Therefore, the twin-lens type stereoscopic camera having zoom lenses becomes complicated in mechanism, and necessitates a time-consuming job for manufacturing and has low mass-productivity.

In addition, two monitors are naturally needed for observing images picked up by the twin-lens type stereoscopic camera, so that the practicability thereof is little. Further, if such two images are to be recorded, it becomes necessary to record two image signals in the state of being synchronized with each other. Therefore, a special recording apparatus is needed. Further, in order to avoid this arrangement, it is conceivable to convert two image signals into one image signal. However, for that purpose, there is needed a special converter for use in displaying and recording right and left parallactic images alternately.

Accordingly, the twin-lens type stereoscopic camera has a large camera body as compared with that of the ordinary single-lens type camera, and the whole system thereof necessitates a special apparatus, as mentioned in the foregoing. Therefore, the twin-lens type stereoscopic camera is large in size, and has low mobility, so that it has been difficult to widely spread the twin-lens type stereoscopic camera into the world.

On the other hand, the camera proposed in the above-mentioned Japanese Patent Publication No. Hei 8-27499 has such a drawback that, since optical paths of parallactic images for the right and left eyes are combined by the half-reflection mirror to be lead to the photographic lens, the amount of light of an image incident on the photographic lens after being transmitted or reflected by the half-reflection mirror becomes half. Further, in the construction of the camera disclosed in the above-mentioned Japanese Patent Publication No. Hei 8-27499, theoretically, the optical path lengths of parallactic images for the right and left eyes are different from each other, so that a difference in magnification between the parallactic images for the right and left eyes would occur. This causes the fatigue of the observer in observing an image picked up by the above-mentioned camera, or makes it impossible for two parallactic images to fuse with each other for a stereoscopic viewing.

BRIEF SUMMARY OF THE INVENTION

It is an object of the invention to provide a stereoscopic image pickup system which is small in size and excellent in mobility and expandability and is capable of easily obtaining high-definition parallactic images.

To attain the above object, in accordance with an aspect of the invention, there is provided a stereoscopic image pickup system for obtaining parallactic images, which comprises a pair of front optical components, the pair of front optical components respectively including a pair of reflecting members capable of rotating around respective predetermined axes and having a reflecting function, and a pair of amount-of-light control members arranged to respectively vary amounts of transmission of light fluxes coming from the pair of reflecting members alternately in a time-series manner, an optical member arranged to superpose respective optical axes of the pair of front optical components on each other, a rear optical component having an optical axis coinciding with the superposed optical axes of the pair of front optical components and having a magnification varying function, and a controller for controlling an amount of parallax of parallactic images by using the pair of reflecting members in accordance with a magnification varying operation of the rear optical component.

In accordance with a preferred aspect of the invention, in the stereoscopic image pickup system, the controller controls the amount of parallax by varying a convergence distance, which is a distance from a point of intersection between a light flux and each of the pair of reflecting members to a point of intersection between the optical axis of the rear optical component and an optical axis of each of the pair of reflecting members.

In accordance with a preferred aspect of the invention, the stereoscopic image pickup system further comprises a distance detector for detecting distance information of an object, and a focal length detector for detecting a focal length of the rear optical component, and the controller controls the amount of parallax by using the distance information detected by the distance detector, the convergence distance found on the basis of rotational angle information of the pair of reflecting members, and the focal length detected by the focal length detector.

In accordance with a preferred aspect of the invention, in the stereoscopic image pickup system, the controller controls the amount of parallax in such a manner that, during the magnification varying operation of the rear optical component, the amount of parallax for an object becomes approximately equal to an amount of parallax obtained at the time of start of the magnification varying operation.

In accordance with a preferred aspect of the invention, in the stereoscopic image pickup system, the controller controls the amount of parallax in such a manner that, during the magnification varying operation of the rear optical component, the amount of parallax for an object becomes within a predetermined range of amounts of parallax.

In accordance with a preferred aspect of the invention, in the stereoscopic image pickup system, the controller controls the amount of parallax in such a manner that the sign of a difference value of amounts of parallax for an object during the magnification varying operation of the rear optical component is positive or negative.

In accordance with a preferred aspect of the invention, in the stereoscopic image pickup system, the controller causes the pair of reflecting members not to rotate during the magnification varying operation of the rear optical component.

In accordance with a preferred aspect of the invention, in the stereoscopic image pickup system, the pair of amount-of-light control members respectively change transmission and non-transmission of light fluxes coming from the pair of reflecting members alternately in a time-series manner.

In accordance with a preferred aspect of the invention, in the stereoscopic image pickup system, each of the pair of amount-of-light control members is a liquid crystal shutter.

In accordance with a preferred aspect of the invention, the stereoscopic image pickup system further comprises a storage device connected to the controller and arranged to store therein the predetermined range of amounts of parallax for every object distance.

In accordance with a preferred aspect of the invention, the stereoscopic image pickup system is a lens unit capable of being detachably attached to a camera unit having an image sensor.

In accordance with a preferred aspect of the invention, in the stereoscopic image pickup system, the controller sends and receives information to and from a controller provided in the camera unit.

In accordance with a preferred aspect of the invention, the stereoscopic image pickup system further comprises an image sensor for converting light incident on the stereoscopic image pickup system into an electrical signal.

In accordance with a preferred aspect of the invention, in the stereoscopic image pickup system, the controller includes a first controller provided in a lens side included in the stereoscopic image pickup system, and a second controller provided in a camera side included in the stereoscopic image pickup system, sending and receiving of information being performed between the first controller and the second controller.

These and further objects and features of the invention will become apparent from the following detailed description of a preferred embodiment thereof taken in conjunction with the accompanying drawings.

DETAILED DESCRIPTION OF THE INVENTION

Hereinafter, a preferred embodiment of the invention will be described in detail with reference to the drawings.

Figure 1:
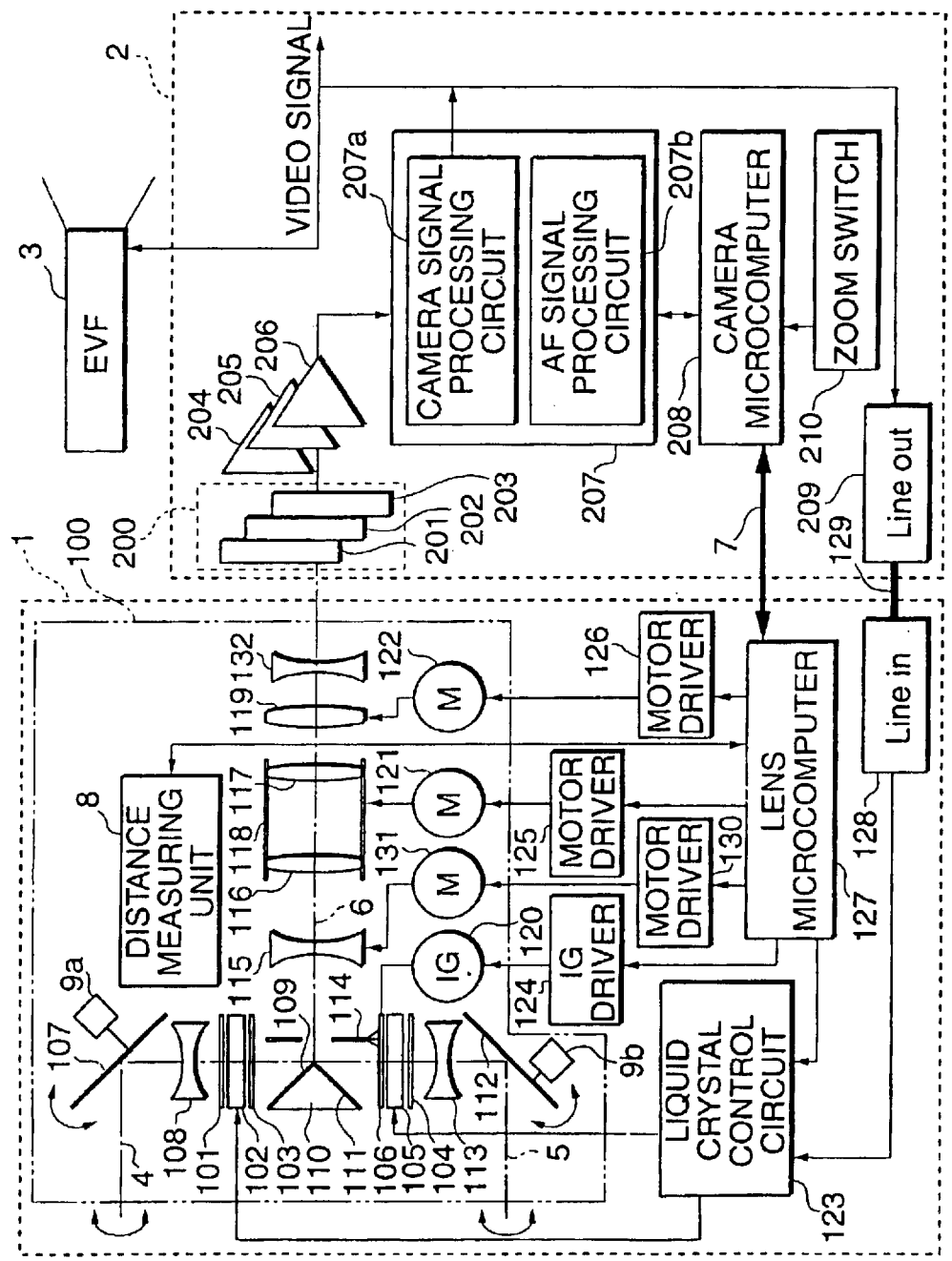
FIG. 1 is a schematic diagram showing the essential parts of a stereoscopic image photographing optical system and a stereoscopic image photographing apparatus having the optical system according to an embodiment of the invention.

FIG. 1 is a schematic diagram showing the basic constituent elements of a stereoscopic image photographing optical system and a stereoscopic image photographing apparatus having the optical system according to the embodiment of the invention. In the stereoscopic image photographing apparatus shown in FIG. 1, light fluxes, representing image information for the right eye and the left eye, which differ in parallax from each other, are alternately lead to an image pickup means in a time-series manner so as to obtain parallactic images.

In FIG. 1, reference numeral 1 denotes the stereoscopic image photographing optical system, which is an interchangeable lens unit standardized with a predetermined format. The interchangeable lens unit 1 includes a photographing optical system 100, a liquid crystal control circuit 123, an IG driver 124, motor drivers 125, 126 and 130, a lens microcomputer 127 for controlling these elements, a video input terminal (Line in) 128, a lens mount (not shown) and a contact block (not shown) which are standardized with the above predetermined format.

Reference numeral 2 denotes a camera body. The camera body 2 includes a camera mount (not shown) and a contact block (not shown) which are standardized with the above predetermined format. The camera mount of the camera body 2 has such a construction as to be capable of being detachably engaged with the lens mount of the interchangeable lens unit 1. When the lens mount is mounted on the camera mount, the contact block of the interchangeable lens unit 1 and the contact block of the camera body 2 come into contact with each other, so that actions as indicated by an arrow 7 in FIG. 1 are performed, i.e., predetermined data communication is performed between the lens microcomputer 127 and a camera microcomputer 208 in accordance with a predetermined format, and the supply of electric power from the camera body 2 to the interchangeable lens unit 1 is performed through the respective contact blocks of the camera body 2 and the interchangeable lens unit 1.

The photographing optical system 100 is composed of lens groups 108, 113, 115, 116, 117, 119 and 132. However, according to the invention, the number of lens groups constituting the photographing optical system 100 and the power arrangement (positive or negative refractive power) are not limited to those of this construction.

In the photographing optical system 100, total-reflection mirrors (optical elements) 107 and 112, which are rotatable around the respective predetermined axes, are arranged to be respectively driven by driving means 9a and 9b, such as stepping motors or DC motors, while being interlocked with each other by an interlocking mechanism (not shown). Further, there is provided an encoder (not shown) for detecting the rotational angles of the mirrors 107 and 112. On the basis of outputs of the encoder, the lens microcomputer 127 finds a distance from the front surface of the photographing optical system 100 (the mirrors 107 and 112 in the case of FIG. 1) to a point where optical axes 4 and 5 of the photographing optical system 100 for obtaining right and left parallactic images intersect (the distance being hereinafter referred to as the convergence distance). When the driving means 9a and 9b are driven, the mirrors 107 and 112 rotate around the respective predetermined axes while being interlocked with each other, thereby varying the directions of the optical axes 4 and 5.

In the present embodiment, the centers of rotation of the mirrors 107 and 112 respectively lie on the rotational axes which are straight lines passing through the intersection point between the optical axis 4 and the mirror 107, or the neighborhood thereof, and the intersection point between the optical axis 5 and the mirror 112, or the neighborhood thereof, and perpendicular to the plane of the drawing in FIG. 1, i.e., the vertical direction of a picture plane. Further, the optical axes 4 and 5 of the photographing optical system 100 for obtaining the right and left parallactic images are placed almost on one and the same plane, and almost intersect (hereinafter referred to as "converge") at predetermined positions including an infinitely distant object point. As mentioned in the foregoing, the mirrors 107 and 112 are rotatable around the predetermined axes. Therefore, by rotating the mirrors 107 and 112, it is possible to vary a convergence position at which the optical axes 4 and 5 converge. For picking up a natural stereoscopic image, it is advantageous to make the convergence position variable.

In addition, in the present embodiment, the interval between the intersection point between the optical axis 4 and the mirror 107 and the intersection point between the optical axis 5 and the mirror 112 (hereinafter referred to as the base line length) is, although not being limited, corresponds to the pupil distance (interpupillary distance) of a human being, for the purpose of picking up a natural stereoscopic image.

Figure 4:
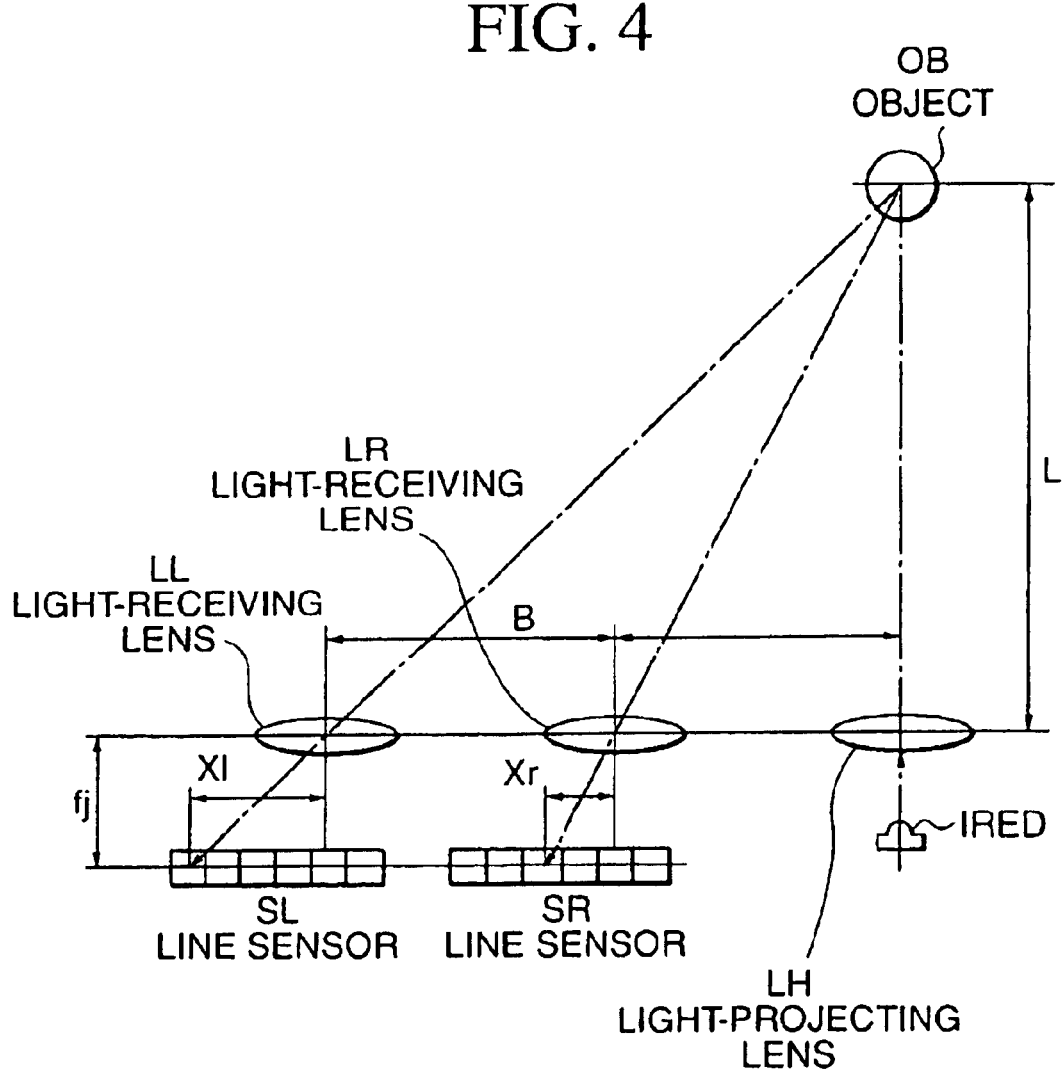
FIG. 4 is a diagram for explaining the principle of measurement by the trigonometric distance measuring method.

The interchangeable lens unit 1 further includes a distance detecting means (distance measuring unit) 8 arranged to detect distance information indicative of a distance to the object, for example, by using a trigonometric distance measuring method. FIG. 4 is a diagram for explaining the principle of measurement by the trigonometric distance measuring method. The distance detecting means 8 is composed of a light projection lens LH, two light receiving lenses LL and LR, an IRED serving as light-emitting means, two line sensors SL and SR each having a plurality of light receiving parts arrayed in a line-like fashion, and a computing means (not shown) for computing the object distance information L on the basis of outputs of the line sensors SL and SR. Light emitted from the IRED is reflected by the object OB. The reflected light from the object OB is collected by the light receiving lens LL and the light receiving lens LR to be imaged on the line sensor SL and the line sensor SR. In this instance, portions of the line sensors SL and SR at which the light is received are detected, so that the difference (Xl−Xr) between the respective portions is obtained. Then, the object distance information L can be obtained by the computing means from the difference (Xl−Xr), the focal length fj of each of the light receiving lenses LL and LR and the interval (base line length) B between the light receiving lenses LL and LR.

While, in the present embodiment, the object distance information is computed according to the trigonometric distance measuring method, it is possible to obtain the object distance information from information on the positions of the respective lens groups of the photographing optical system. This method may be of course employed.

Referring back to FIG. 1, the lens groups 108, 113, 115 and 132 are lens groups of negative refractive power each having one or a plurality of lens elements, and the lens groups 116, 117 and 119 are lens groups of positive refractive power each having one or a plurality of lens elements. In the invention, such a lens construction is not a limited one. Reference numeral 110 denotes a combining optical element, which is composed of a triangular prism having total-reflection mirror surfaces 109 and 111. Reference numeral 101, 103, 104 and 106 denote polarizing plates, and reference numeral 102 and 105 denote liquid crystal elements (shutters) having a shutter function. The polarizing plates 101 and 103 and the liquid crystal element 102 constitute, in combination, an amount-of-light control means, which has the shutter function in such a way that, when an electric field is applied to the liquid crystal element 102, the combination of the polarizing plates 101 and 103 and the liquid crystal element 102 is brought into a transmissive state in which a light flux is allowed to pass or a non-transmissive state in which a light flux is prevented from passing. The other combination of the polarizing plates 104 and 106 and the liquid crystal element 105 operates in the similar way.

While, in the present embodiment, an FLC (ferroelectric liquid crystal display) is used as the liquid crystal element, a TN (twisted nematic liquid crystal display) or an STN (supertwisted nematic liquid crystal display) may be used instead. Further, the polarizing plates 101 and 103 and the polarizing plates 104 and 106 may be fixed by adhesion to or may be separately disposed from the liquid crystal elements 102 and 105, respectively.

The photographing optical system 100 further includes an iris 114 serving as an amount-of-light adjusting means. In the present embodiment, as shown in FIG. 1, the entrance pupil (iris) 114 of the photographing optical system 100 is disposed on the object side in the interior of the photographing optical system 100, and the triangular prism 110 is disposed at the entrance pupil 114 in such a manner that right and left images (parallactic images) are led to the lens group 115.

In the present embodiment, an aperture of the iris 114 is divided into two parts by the triangular prism (combining optical element) 110 provided at the iris 114. The respective optical axes of the pair of lens groups 108 and 113 are superposed on each other on the ridgeline including an apex angle of the triangular prism 110, and the superposed optical axes coincide with the optical axis of the lens group 115. Then, the transmittances of the right and left shutters 102 and 105 are alternately changed, so that parallactic images for the right and left eyes are obtained in a time-series manner at an image pickup part 200 disposed at the image plane of the photographing optical system 100.

In the present embodiment, the iris 114 is disposed relatively closer to the object side so as to reduce the effective light-flux diameter of the front lens member of the photographing optical system 100. The photographing optical system 100 further includes an IG meter 120, DC motors 131 and 121 and a stepping motor 122. The lens groups 108, 113 and 132 are fixed lens groups. The lens group 116 is a variator lens. The lens group 117 is a compensator lens. The lens group 115 is a lens group having the focusing function. In the photographing optical system 100 according to the present embodiment, the variation of magnification is effected by moving the lens group 116 and the lens group 117 along the optical axis 6, and the focusing operation is effected by moving the lens group 115 along the optical axis 6. The lens group 119 is a lens unit for adjusting the flange back distance and is movable along the optical axis 6.

In the present embodiment, the lens groups 116 and 117 are arranged to be movable in the optical axis direction in mechanical association with a cam tube 118. The cam tube 118 is arranged to be rotated by the DC motor 121. Incidentally, the driving method for the lens groups 116 and 117 is not limited to this arrangement. Instead, the lens groups 116 and 117 may be independently driven by the respective driving means without using a cam tube. Further, the stepping motor 122 is arranged to drive the lens group 119 in accordance with the output of a temperature sensor (not shown) so as to compensate for the variation of the flange back distance due to a change in temperature. In addition, the lens group 119 has the wobbling function for AF (automatic focusing). These driving sources are not limited to the DC motor 121 and the stepping motor 122, but may be electromagnetic motors other than a stepping motor or a DC motor, solid-state motors such as an ultrasonic motor, electrostatic motors, or the like.

The position of the lens group 116 in the optical axis direction is detected by a rotary encoder of the variable resistor type engaged with a reduction gear train of a DC motor (not shown). This encoder is arranged to output a value corresponding to the rotational angle of the DC motor. Further, the respective positions of the lens groups 116 and 117 in the optical axis direction are detected by a rotary encoder of the variable resistor type arranged to detect the rotational angle of the motor 121, which drives the cam tube 118. This encoder enables the lens microcomputer 127 to find the focal length of the photographing optical system 100. The position of the lens group 119 in the optical axis direction is detected by counting and converting the number of driving pulses for driving the stepping motor 122. Incidentally, the means for detecting the positions of the lens groups 115, 116, 117 and 119 are not limited to those mentioned above, but may be the ones of the electrostatic-capacitance type, or of the optical type such as a PSD (position detecting element) or an IRED (infrared light emitting diode).

The IG meter 120 is arranged to adjust the amount of light by driving the iris 114. Further, an ND (neutral-density) filter (not shown) is disposed within the photographing optical system 100.

The zoom type of the photographing optical system 100 according to the present embodiment is an inner-focus zoom type. Thus, during zooming, the lens groups 116 and 117 only are driven, while the focusing lens group 115 is not driven. Incidentally, the zoom type is not limited to such an arrangement, and may be the so-called rear-focus zoom type in which the zooming action is effected by driving predetermined lens groups in association with each other during zooming.

The camera body 2 includes the three-plate (RGB) type image pickup part 200, amplifiers 204, 205 and 206 connected correspondingly with image sensors 201, 202 and 203 constituting the image pickup part 200, a signal processing circuit 207 connected to the amplifiers 204, 205 and 206, the camera microcomputer 208 connected to the signal processing circuit 207, a zoom switch 210 connected to the camera microcomputer 208, a video output terminal (Line out) 209, and an electronic viewfinder (EVF) 3.

Further, the signal processing circuit 207 includes a camera signal processing circuit 207a and an AF signal processing circuit 207b. The output of the camera signal processing circuit 207a is externally outputted as a video signal. The output of the camera microcomputer 208 is supplied to the lens microcomputer 127 of the interchangeable lens unit 1.

In the three-plate type image pickup part 200, an incident light flux picked up by the photographing optical system 100 is separated into three original-color components by a first prism, a second prism and a third prism (color-separation prisms)(not shown). Of the three original-color components, the red component is imaged on the image sensor 201, the green component is imaged on the image sensor 202, and the blue component is imaged on the image sensor 203. Object images thus-formed on the image sensors 201, 202 and 203 are photoelectrically converted into electrical signals, which are respectively supplied to the amplifiers 204, 205 and 206.

The electrical signals which have been respectively amplified to optimum levels by the amplifiers 204, 205 and 206 are converted into a television signal of the standard system by the camera signal processing circuit 207a. The television signal is externally outputted as a video signal, and, at the same time, is supplied to the AF signal processing circuit 207b. The AF signal processing circuit 207b forms an AF evaluation value signal by using the three original-color video signals supplied from the amplifiers 204, 205 and 206.

The camera microcomputer 208 reads out the AF evaluation value signal formed by the AF signal processing circuit 207b, by using a data reading program which has been stored beforehand, and transfers the read-out AF evaluation value signal to the lens microcomputer 127. The lens microcomputer 127 performs a focusing action by driving and controlling the lens group 115 or (and) the lens group 119 on the basis of the AF evaluation value signal as transferred or (and) the output of the distance detecting means 8.

Next, the operation of picking up parallactic images for the right and left eyes by the image pickup part (CCD) 200 according to the present embodiment will be described.

The video output terminal 209 of the camera body 2 and the video input terminal 128 of the lens unit 1 are made to be connected to each other by a cable 129, so that a video signal obtained by the camera body 2 is supplied to the liquid crystal control circuit 123. An image signal in the present embodiment is an interlaced signal of the NTSC system. Accordingly, 60 fields of the image signal are outputted for one second. The image signal is subjected to synchronization by using a vertical synchronizing signal and a horizontal synchronizing signal. The vertical synchronizing signal is superposed on the forefront of each of 60 fields of the image signal.

Figure 2:
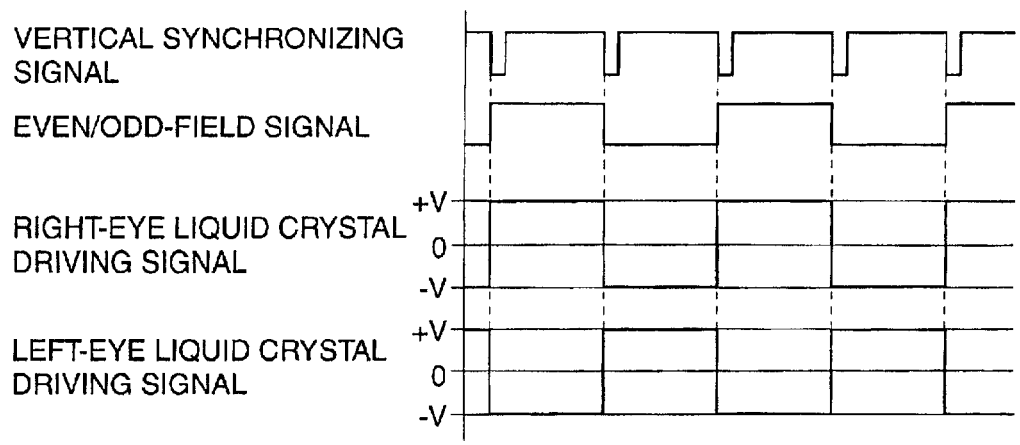
FIG. 2 is a timing chart for explaining driving signals for driving liquid crystal elements in the embodiment of the invention.
Figure 3:
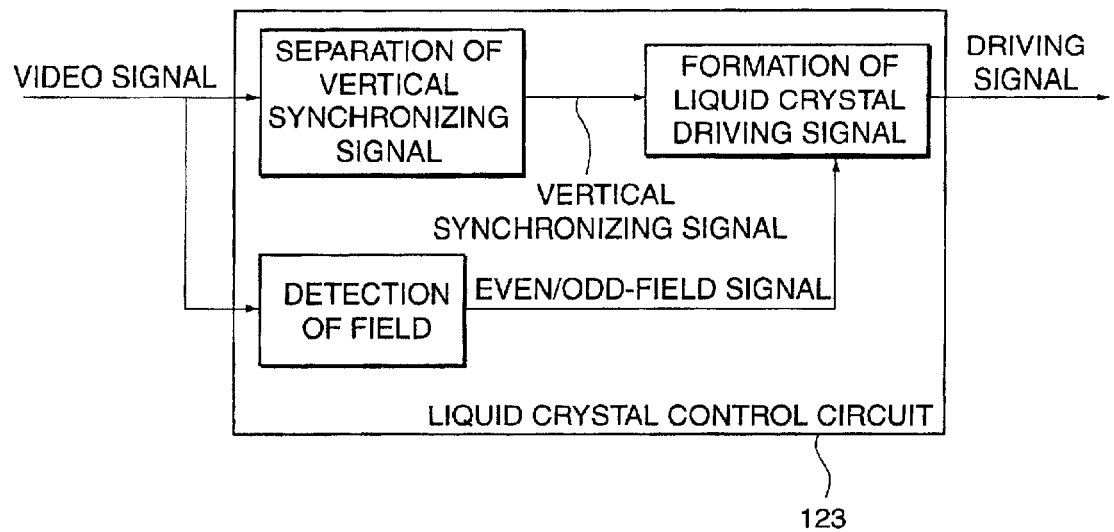
FIG. 3 is a block diagram for explaining the process of producing the driving signals for driving the liquid crystal elements in the embodiment of the invention.

Accordingly, according to the present embodiment, as shown in FIGS. 2 and 3, in the liquid crystal control circuit 123, the vertical synchronizing signal, which appears at intervals of 1/60 second, is separated from the inputted image signal. Further, an odd/even-field signal for discriminating between an odd field and an even field is formed from the inputted image signal. The discrimination between an odd field and an even field can be performed by finding whether the vertical synchronizing signal coincides with the edge of the horizontal synchronizing signal (i.e., an odd field) or lags behind the edge of the horizontal synchronizing signal as much as ½ H (H being a horizontal synchronizing period) (i.e., an even field). Then, a right-eye liquid crystal driving signal and a left-eye liquid crystal driving signal are formed from the vertical synchronizing signal and the odd/even-field signal, and are outputted from the liquid crystal control circuit 123. The right-eye liquid crystal driving signal and the left-eye liquid crystal driving signal are driving signals for causing the image pickup part (CCD) 200 to pick up parallactic images for the right and left eyes alternately in a time-divisional manner. Thus, during a period of time when one of the parallactic images for the right and left eyes is being picked up, one liquid crystal shutter associated with this parallactic image is brought into a transmissive state and the other liquid crystal shutter is brought into a non-transmissive state.

Referring to FIG. 2, assuming that the non-transmissive state occurs when the driving signal has a positive voltage and the transmissive state occurs when the driving signal has a negative voltage, the liquid crystal driving signals are supplied to the liquid crystal elements 102 and 105 in such a manner that the liquid crystal element for the left eye is in the transmissive state while the liquid crystal element for the right eye is in the non-transmissive state and the liquid crystal element for the left eye is in the non-transmissive state while the liquid crystal element for the right eye is in the transmissive state.

With the liquid crystal elements 102 and 105 alternately driven as described above, while the liquid crystal element 102 is in the non-transmissive state, a video image formed with a light flux having passed through the liquid crystal element 105 is picked up by the image pickup part (CCD) 200, and while the liquid crystal element 105 is in the non-transmissive state, a video image formed with a light flux having passed through the liquid crystal element 102 is picked up by the image pickup part (CCD) 200. In the present embodiment, since there is the odd/even-field signal as information, an image signal for the left eye is provided for an odd field, and an image signal for the right eye is provided for an even field.

With the above-described image pickup operation, a parallactic image for the right eye and a parallactic image for the left eye are alternately picked up by the image pickup part (CCD) 200 in such a manner that 60 images in total composed of 30 images for the right eye and 30 images for the left eye are picked up for one second. Since the timing at which the signal reading is performed from the image pickup part (CCD) 200 is synchronized with the above-mentioned timing, a parallactic image for the right eye and a parallactic image for the left eye are alternately outputted as image signals from the signal processing circuit 207.

The method of separating a vertical synchronizing signal and the method of detecting even and odd fields are known in the art, and are not limited to the above-mentioned methods. Further, while, in the present embodiment, the cable 129 is used for inputting an image signal to the liquid crystal control circuit 123, information on the vertical synchronizing signal and information on the even/odd field may be communicated through data communication between the lens microcomputer 127 and the camera microcomputer 208.

Incidentally, while, in the case of FIG. 2, the rise and fall of the right-eye liquid crystal driving signal and the left-eye liquid crystal driving signal are made to coincide with each other in synchronism with the fall of the vertical synchronizing signal, the rise and fall of the right-eye liquid crystal driving signal and the left-eye liquid crystal driving signal may occur within the vertical retrace interval (20H) of an image signal.

Further, while, in the present embodiment, an image signal for the left eye is provided for an odd field and an image signal for the right eye is provided for an even field, this arrangement may be changed such that an image signal for the right eye is provided for an odd field and an image signal for the left eye is provided for an even field.

Next, a first example of the convergence control operation during zooming (during the variation of magnification) of the photographing optical system 100 according to the present embodiment will be described with reference to the flow chart of FIG. 5.

Figure 5:
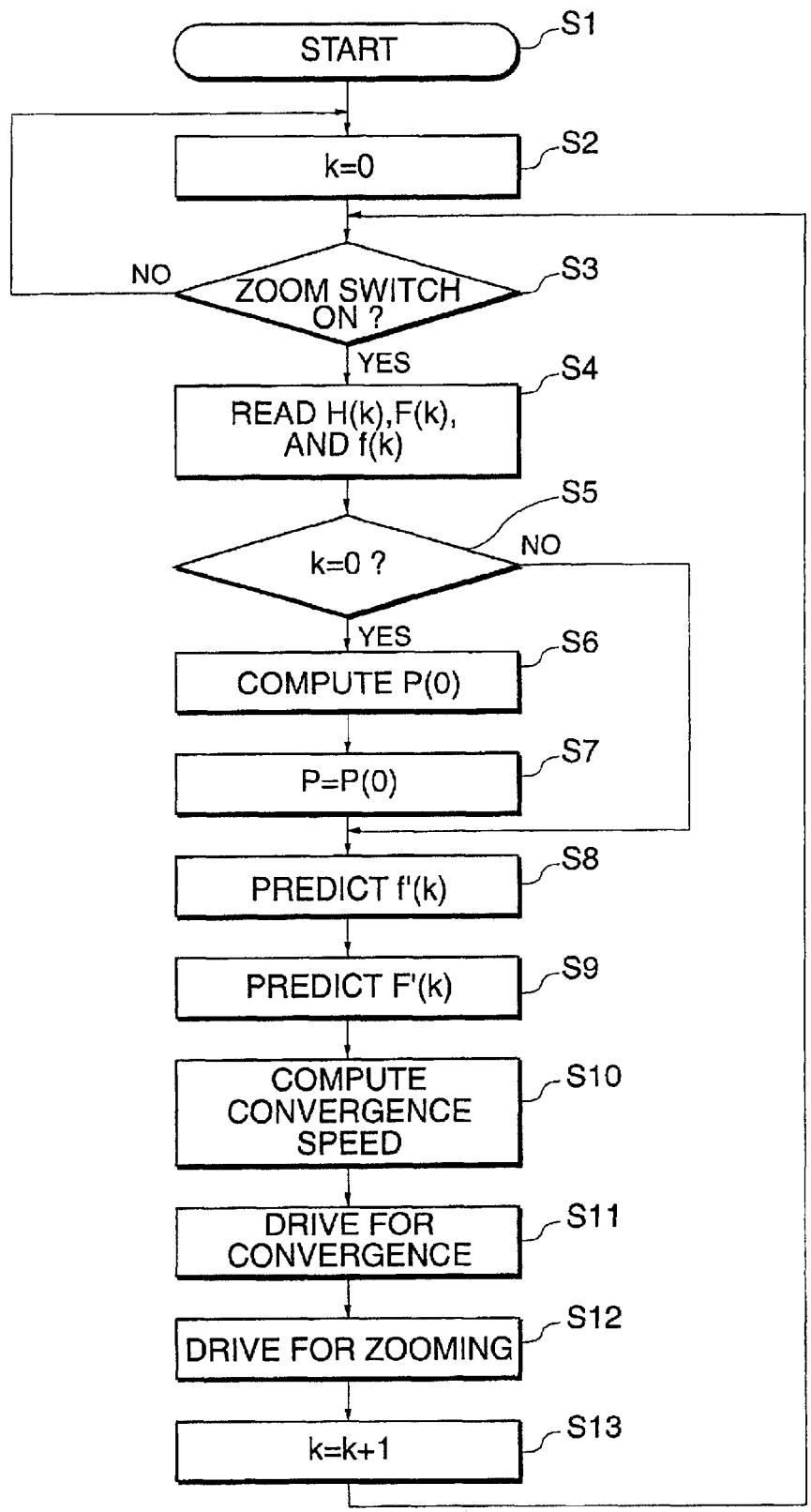
FIG. 5 is a flow chart showing the action of a first example of the convergence control operation according to the embodiment of the invention.

Referring to FIG. 5, the convergence control operation during zooming is started at step S1. This start is commanded by the lens microcomputer 127.

At step S2, the variables are initialized, and "0" is stored in the value "k" of the counter.

At step S3, a check is made to find if the zoom switch 210 is in the on-state or in the off-state. If it is found that the zoom switch 210 is in the on-state, the procedure proceeds to step S4. If it is not, the procedure returns to step S2.

At step S4, values which correspond respectively to the object distance (information on the object) H(k) obtained from the distance detecting means 8, the convergence distance F(k) obtained from the output of the encoders for detecting the rotational angles of the mirrors 107 and 112, and the focal length f(k) of the entire optical system obtained from the zoom encoder are read.

At step S5, a check is made to find if the value "k" of the counter is "0", i.e., if the initializing operation is the first one since the zoom switch 210 is turned on. If so, the procedure proceeds to step S6. If not, the procedure proceeds to step S8.

At step S6, the amount of parallax P(0) of parallactic images for the right and left eyes in the initial stage is computed by substituting the object distance H(0), the convergence distance F(0) and the focal length f(0), as read at step S4, and the mirror interval 2I, the width S of the display screen and the length C of the longer side of the CCD, into the following equation:

$$P = \frac{2 \cdot S \cdot f \cdot I \cdot (H - F)}{C \cdot (I^2 + F \cdot H)}$$

The details of this equation will be described later.

Here, the convergence distance F(0) means the distance from an intersection point Q1 between the optical axis 6 and the line segment (base line length) connecting intersection points Pa and Pb between the mirror 107 and the optical axis 4 and between the mirror 112 and the optical axis 5 to an intersection point Q2 between the optical axes 4 and 5. The object distance H(0) means the distance from the object OB to the intersection point Q1. The mirror interval 2I means the distance from the point Pa to the point Pb.

At step S7, the amount of parallax P(0) is stored in a variable P. The variable P is set to the amount of parallax obtained at the time of start of zooming. In the present action, the convergence is controlled in such a manner that the amount of parallax becomes the value of the variable P during zooming.

At step S8, the zooming speed is read, so that the focal length f'(k) to be obtained after the lapse of a predetermined period of time Δt is calculated and predicted. Thus, since the respective positions of the lens groups of the photographing optical system 100 to be taken after the lapse of the predetermined period of time Δt can be found from the zooming speed, it is possible to calculate the focal length f'(k) from the respective positions of the lens groups.

At step S9, the amount of parallax P, the object distance H(k) and the focal length f'(k) are substituted into a predetermined formula to calculate a convergence distance F'(k). The convergence distance F'(k) is such a convergence distance as to cause the amount of parallax to become the value of the variable P when the focal length has become the value f'(k).

At step S10, such a convergence speed as to cause the convergence distance to become the value F'(k) after the lapse of the predetermined period of time Δt is calculated from the convergence distances F(k) and F'(k) and the predetermined period of time Δt.

At step S11, the mirrors 107 and 112 are driven by driving the driving means 9a and 9b in such a way as to realize the convergence speed found at the step S10.

At step S12, the motor 121 is driven to perform zooming.

At step S13, the value "k" of the counter is incremented by "1", and the procedure returns to step S3.

With the above-described series of actions performed, the amount of parallax P obtained at the time of start of zooming is made to remain unchanged even after the zooming action. This means that, even if the zooming action is performed, the position of the main object in a display space can be unchanged and fixed. Here, the display space is a space in which the main object is displayed when a stereoscopic image is viewed with a predetermined means. In this instance, the screen size of a display means and the viewing distance are made to be fixed. Further, as the viewing direction, there are a direction toward the observer and a direction of depth, which is a direction opposite to the direction toward the observer.

Next, a second example of the convergence control operation during zooming of the photographing optical system 100 according to the present embodiment will be described with reference to the flow chart of FIG. 6.

Figure 6:
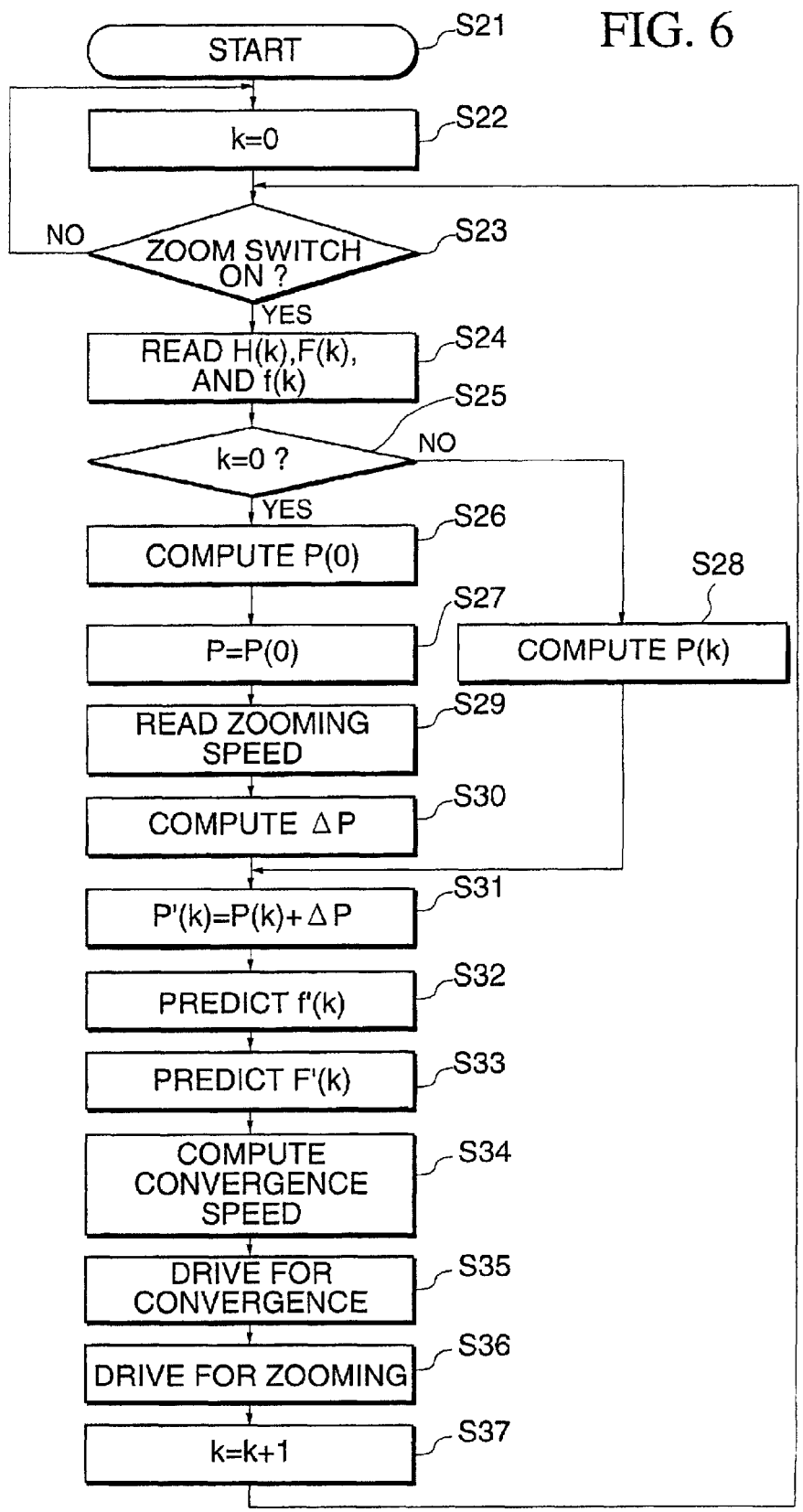
FIG. 6 is a flow chart showing the action of a second example of the convergence control operation according to the embodiment of the invention.

Referring to FIG. 6, the convergence control operation during zooming is started at step S21. This start is commanded by the lens microcomputer 127.

At step S22, the variables are initialized, and "0" is stored in the value "k" of the counter.

At step S23, a check is made to find if the zoom switch 210 is in the on-state or in the off-state. If it is found that the zoom switch 210 is in the on-state, the procedure proceeds to step S24. If it is not, the procedure returns to step S22.

At step S24, values which correspond respectively to the object distance H(k) obtained from the distance detecting means 8, the convergence distance F(k) obtained from the output of the encoders for detecting the rotational angles of the mirrors 107 and 112, and the focal length f(k) of the entire optical system obtained from the zoom encoder are read.

At step S25, a check is made to find if the value "k" of the counter is "0", i.e., if the initializing operation is the first one since the zoom switch 210 is turned on. If so, the procedure proceeds to step S26. If not, the procedure proceeds to step S28.

At step S26, the amount of parallax P(0) of parallactic images for the right and left eyes in the initial stage is computed by substituting the object distance H(0), the convergence distance F(0) and the focal length f(0), as read at step S24, into a predetermined equation.

At step S27, the amount of parallax P(0) is stored in a variable P. The variable P is set to the amount of parallax obtained at the time of start of zooming.

At step S28, the amount of parallax P(k) is computed by substituting the object distance H(k), the convergence distance F(k) and the focal length f(k), as read at step S24, into the predetermined equation.

At step S29, a zooming period of time Zt is predicted on the basis of a zooming speed. Thus, the zooming period of time Zt is predicted on the basis of the current focal length, the zooming direction (the direction toward the long focal length side or the direction toward the short focal length side) and a focal length range. For example, although this example is not a limited one, if the zooming direction is the direction toward the long focal length side, a value obtained by subtracting the current focal length from the maximum focal length is divided by the zooming speed, so that the zooming period of time can be computed and predicted.

At step S30, the amount of change $\Delta P$ of the amount of parallax occurring for a predetermined period of time $\Delta t$ is computed. This amount of change $\Delta P$ is found from an allowable amount of parallax Pt, the amount of parallax P(0) and the zooming period of time Zt. For example, although this example is not a limited one, a value obtained by subtracting the amount of parallax P(0) from the allowable amount of parallax Pt is divided by the zooming period of time Zt, so that the amount of change $\Delta P$ can be computed. Here, the allowable amount of parallax Pt is assumed to be a predetermined amount. In the case of the second embodiment, the allowable amount of parallax Pt (a range in which an object is displayed in the display space) is set for every object distance, and is read to be used in the present routine. Further, the second embodiment is set such that, when zooming is performed toward the long focal length side, the main object moves, in the display space, toward the observer side, and, when zooming is performed toward the short focal length side, the main object moves, in the display space, toward the depth side. However, this setting may be reversed, or may be changed such that the photographer is enabled to select, with a predetermined method, such as a menu, a dial, a switch or the like, the moving direction and the amount of movement of the main object occurring during zooming.

At step S31, an amount of parallax P'(k) to be obtained after the lapse of the predetermined period of time $\Delta t$ is computed.

At step S32, a focal length f'(k) to be obtained after the lapse of the predetermined period of time $\Delta t$ is computed and predicted from the zooming speed. Thus, since the respective positions of the lens groups of the photographing optical system 100 to be taken after the lapse of the predetermined period of time $\Delta t$ are found from the zooming speed, the focal length f'(k) can be computed from the respective positions of the lens groups.

At step S33, the amount of parallax P'(k), the object distance H(k) and the focal length f'(k) are substituted into a predetermined formula to calculate a convergence distance F'(k). The convergence distance F'(k) is such a convergence distance as to cause the amount of parallax to become the value P'(k) when the focal length has become the value f'(k).

At step S34, such a convergence speed as to cause the convergence distance to become the value F'(k) after the lapse of the predetermined period of time $\Delta t$ is calculated from the convergence distances F(k) and F'(k) and the predetermined period of time $\Delta t$.

At step S35, the mirrors 107 and 112 are driven by driving the driving means 9a and 9b in such a way as to realize the convergence speed found at the step S34.

At step S36, the motor 121 is driven to perform zooming.

At step S37, the value "k" of the counter is incremented by "1", and the procedure returns to step S23.

With a series of actions as described in the foregoing, the amount of parallax P obtained at the time of start of zooming becomes within a range of the allowable amount of parallax according to the zooming action. This arrangement makes it possible to vary the position of a main object in the display space by performing zooming, so that it becomes possible to produce a special effect of photography during zooming. More specifically, it becomes possible that, when zooming is performed, the object moves toward the observer side or toward the depth side in the display space. Further, since, in this instance, the amount of parallax is controlled in such a way as to be prevented from exceeding the allowable amount of parallax, it is possible to realize a natural stereoscopic image.

Next, the amount of parallax P in the present embodiment will be described.

Figure 7:
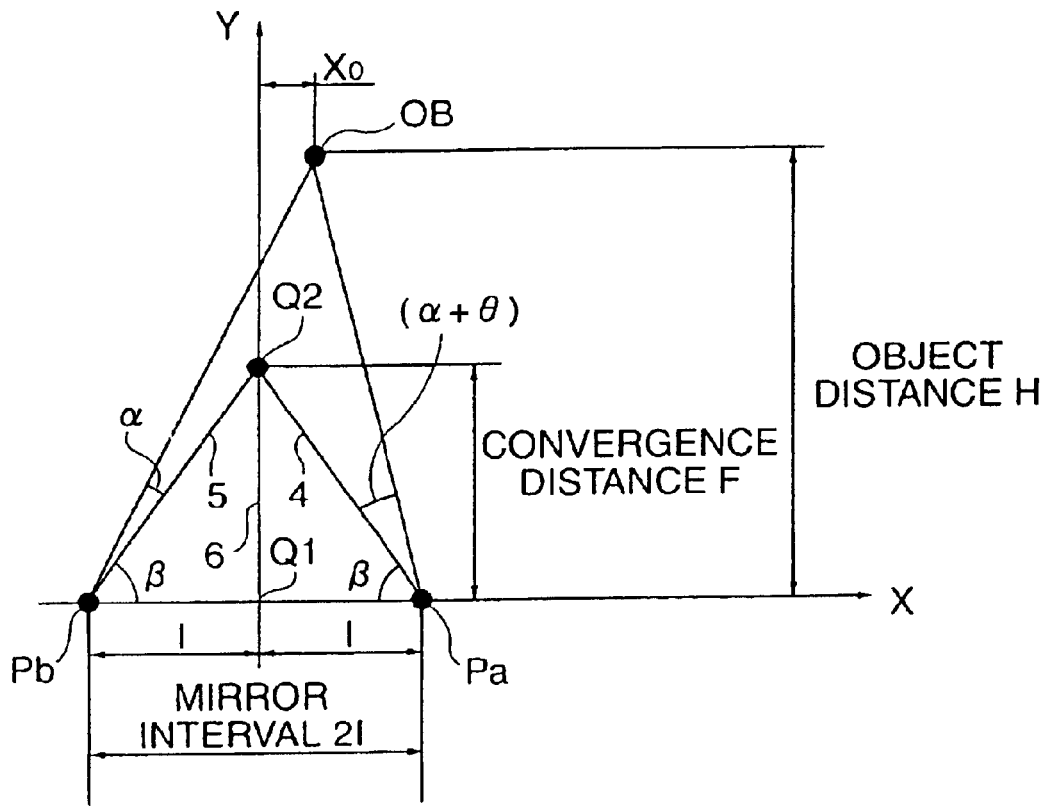
FIG. 7 is a diagram for explaining the method of finding an amount of parallax in the embodiment of the invention.

First, a condition to be taken at the time of photography is described. The condition to be taken for parallactic images at the time of photography for parallactic images is illustrated in FIG. 7 and is considered on the basis of an X-Y plane. In the X-Y plane shown in FIG. 7, the base line is the X axis, the base line length is represented by 2I, and an angle which the base line (X axis) makes with each of right and left optical axes 4 and 5 when the convergence is set to a point Q2 is represented by β. When an object OB is located at a point of coordinates (Xo, H), an angle which a line connecting the point Q2 and an intersection point Pb between the base line and the optical axis 5 makes with a line connecting the point Pb and the point of the object OB is represented by α, and an angle which a line connecting the point Q2 and an intersection point Pa between the base line and the optical axis 4 makes with a line connecting the point Pa and the point of the object OB is represented by (α+θ). In this instance, the following geometric relations are established:

$$\tan(\alpha+\beta)=H/(I+Xo) \tag{a1}$$

$$\tan(\alpha+\theta+\beta)=H/(I-Xo) \tag{a2}$$

$$\tan\beta=F/I \tag{a3}$$

The following equation is obtained from the equations (a1) and (a3):

$$(I\cdot\tan\alpha+F)/(I-F\cdot\tan\alpha)=H/(I+Xo) \tag{a4}$$

The following equation is obtained from the equations (a2) and (a3):

$$(I\cdot\tan(\alpha+\theta)+F)/(I-F\cdot\tan(\alpha+\theta))=H/(I-Xo) \tag{a5}$$

Figure 8:
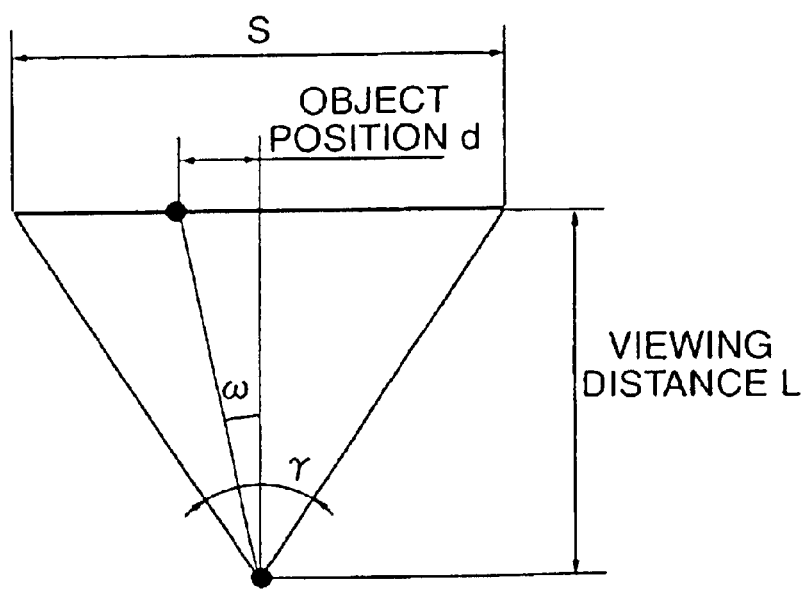
FIG. 8 is a diagram for explaining the method of finding the amount of parallax in the embodiment of the invention.

FIG. 8 shows a condition under which parallactic images obtained in the condition shown in FIG. 7 are displayed on a display device (display means). In FIG. 8, S represents the length of a display screen of the display device in the horizontal direction (the longer side), L represents the distance from the eye of the observer to the display screen, γ represents a horizontal angle of view of the display screen, d represents the position in the horizontal direction of the object from the center of the display screen, and ω represents a horizontal angle which a line connecting the eye of the observer and the object makes with a line connecting the eye of the observer and the center of the display screen. Further, the focal length of the lens (the photographing optical system) is represented by f, the length of the longer side of the CCD (the image pickup means) is represented by C, and the position in the horizontal direction of the object from the center of the surface of the CCD is represented by d'.

Positions corresponding to the right image plane and the left image plane with respect to the above-mentioned positions d and d' are represented by dR, dL, dR' and dL', respectively. in this instance, the following geometric relations are established:

$$dL'/C=dL/S \quad (a6)$$

$$dL'=f\cdot\tan\alpha \quad (a7)$$

$$dL=(S\cdot f\cdot\tan\alpha)/C \quad (a8)$$

$$dR=(S\cdot f\cdot\tan(\alpha+\theta))/C \quad (a9)$$

If "tan α" is eliminated from the equation (a4) by using the equation (a8) and, then, the equation (a4) is rearranged, the following equation is obtained:

$$(I\cdot dL\cdot C/(S\cdot f)+F)/(I-F\cdot dL\cdot C/(S\cdot f))=H/(I+Xo) \quad (a10)$$

Similarly, if "tan (α+θ)" is eliminated from the equation (a5) by using the equation (a9) and, then, the equation (a5) is rearranged, the following equation is obtained:

$$(I\cdot dR\cdot C/(S\cdot f)+F)/(I-F\cdot dR\cdot C/(S\cdot f))=H/(I-Xo) \quad (a11)$$

If the equations (a10) and (a11) are solved in respect of dL and dR, respectively, the following solutions are obtained:

$$dL=S\cdot f\cdot(H\cdot I-F\cdot(I+Xo))/(C\cdot(I\cdot(I+Xo)+F\cdot H)) \quad (a12)$$

$$dR=S\cdot f\cdot(H\cdot I-F\cdot(I-Xo))/(C\cdot(I\cdot(I-Xo)+F\cdot H)) \quad (a13)$$

Accordingly, the amount of parallax P on the image plane is found by the following equation:

$$P=dL+dR \quad (a14)$$

Here, if "Xo=0" is set in an approximate fashion, the amount of parallax P becomes as follows:

$$P = \frac{2\cdot S\cdot f\cdot I\cdot(H-F)}{C\cdot(I^2+F\cdot H)}$$

As mentioned above, the amount of parallax P is found from the focal length f of the lens, the convergence distance F, the mirror interval 2I, the length C of the longer side of the CCD image sensor, the length S in the horizontal direction of the display screen, and the object distance H.

Next, in the present embodiment, as a third example of the convergence control operation during zooming of the photographing optical system, a case where the convergence control operation is not performed during zooming will be described. In the above-mentioned first and second examples of the convergence control operation, when zooming is being performed, the movement of the object is fixed or controlled in the display space. However, in some cases, according to the photographing scene, these photographing methods had better not be used. In such a case, the convergence distance is made not to vary during zooming. This operation can be designated by the photographer with a predetermined method.

As has been described in the foregoing, the stereoscopic image photographing apparatus according to the present embodiment has the magnification varying function and is arranged to control the amount of parallax for the object during the process of the magnification varying operation of the photographing optical system for forming, on the image sensor, parallactic images for the right and left eyes. Further, the stereoscopic image photographing apparatus has a computing means for computing the amount of parallax for the object.

Here, as the method for controlling the amount of parallax, the mirrors are driven in such a way that, during the process of the magnification varying operation of the lens unit, the amount of parallax for the object becomes approximately equalt to an amount of parallax obtained at the time of start of zooming, and the mirrors are driven in such a way that, during the process of the magnification varying operation of the lens unit, the amount of parallax for the object becomes within a predetermined range of amounts of parallax.

Then, the predetermined range of amounts of parallax is beforehand stored in a storage means connected to the lens microcomputer, or is designated by the photographer. Further, the mirrors are driven in such a way that the sign of a difference value of the amounts of parallax for the object during the process of the magnification varying operation of the lens unit is positive or negative.

Then, the sign of a difference value of the amounts of parallax for the object is designated by the photographer. Further, the mirrors are stopped (i.e., controlled) during the process of the magnification varying operation of the lens unit.

According to the present embodiment, it is possible to pick up photographic parallactic images for the right and left eyes with a substantially single photographing lens without the necessity of two photographing lenses. This makes it possible to realize the reduction in size of the stereoscopic image photographing apparatus and to eliminate the adverse influence due to the individual differences of photographing lenses for the right and left eyes, so that a high-definition stereoscopic image can be picked up with a simple construction. Further, mirrors and liquid crystal shutters are disposed symmetrically with respect to the optical axis of the photographing lens, so that it is possible to equalize optical path lengths to the object for parallactic images for the right and left eyes. This makes it possible to eliminate the difference in magnification of the parallactic images for the right and left eyes so as to pick up a high-definition stereoscopic image. Further, since the parallactic images for the right and left eyes are formed on one image sensor by the photographing optical system, it is possible to make any surplus electrical circuits unnecessary, thereby realizing the reduction in size of the stereoscopic image photographing apparatus. In addition, the photographing optical system according to the present embodiment can be provided as one of photographing lenses of the interchangeable lens system, and the camera body has no necessity of having any particular arrangement for picking up a stereoscopic image, so that an ordinary photographing lens for two-dimensional photography can also be used with the camera body. Accordingly, the stereoscopic image photographing apparatus according to the present embodiment is excellent in expandability and is able to give great advantageous effects to the user. Further, a plurality of photographing lenses for stereoscopic-image photography, which differ in performance, such as focal length, can be selectively used with the same camera body.

Further, since the convergence control operation at the time of zooming is automatically performed, it is possible to mitigate a burden on the photographer at the time of photography and to pick up a high-definition and natural stereoscopic image.

According to the invention, it is possible to attain a stereoscopic image photographing optical system which is small in size and excellent in mobility and expandability and is capable of easily obtaining high-definition parallactic images, and a stereoscopic image photographing apparatus having the optical system.

What is claimed is:

1. A stereoscopic image pickup system for obtaining parallactic images, said stereoscopic image pickup system comprising:
   a pair of front optical components, said pair of front optical components respectively including (a) a pair of reflecting members, each reflecting member rotating around a respective predetermined axis at a first speed, and (b) a pair of amount-of-light control members arranged to respectively vary amounts of transmission of light fluxes traveling from said pair of reflecting members alternately in a time-series manner;
   a combining optical member arranged to superpose optical axes of said pair of front optical components;
   a rear optical component, said rear component including a zooming optical member, the zooming optical member moving on an optical axis superposed by said combining optical member at a second speed so as to vary an image magnification; and
   a controller for calculating the first speed of each one of the pair of reflecting members in accordance with the second speed of the zooming optical member, so that an amount of parallax of parallactic images is within a predetermined range,
   wherein said pair of amount-of-light control members are positioned between said pair of reflecting members and said optical member, respectively, along the optical axes.

2. A stereoscopic image pickup system according to claim 1, wherein said controller controls the amount of parallax of parallactic images by varying a convergence distance, which is a distance from a point of intersection between a light flux and each of said pair of reflecting members to a point of intersection between the optical axis of said rear optical component and an optical axis of each of said pair of reflecting members.

3. A stereoscopic image pickup system according to claim 2, further comprising:
   a distance detector for detecting distance information of an object; and
   a focal length detector for detecting a focal length of said rear optical component,
   wherein said controller controls the amount of parallax by using the distance information detected by said distance detector, the convergence distance found on the basis of rotational angle information of said pair of reflecting members, and the focal length detected by said focal length detector.

4. A stereoscopic image pickup system according to claim 1, wherein said controller controls the amount of parallax of parallactic images in such a manner that, during a magnification varying operation of said rear optical component, the amount of parallax for an object becomes approximately equal to an amount of parallax obtained at the time of start of the magnification varying operation.

5. A stereoscopic image pickup system according to claim 1, wherein said controller controls the amount of parallax of parallactic images in such a manner that the sign of a difference value of amounts of parallax for an object during a magnification varying operation of said rear optical component is positive or negative.

6. A stereoscopic image pickup system according to claim 1, wherein said controller causes said pair of reflecting members not to rotate during a magnification varying operation of said rear optical component.

7. A stereoscopic image pickup system according to claim 1, wherein said pair of amount-of-light control members respectively change transmission and non-transmission of light fluxes coming from said pair of reflecting members alternately in a time-series manner.

8. A stereoscopic image pickup system according to claim 1, wherein each of said pair of amount-of-light control members is a liquid crystal shutter.

9. A stereoscopic image pickup system according to claim 1, further comprising a storage device connected to said controller and arranged to store therein the predetermined range of amounts of parallax for every object distance.

10. A stereoscopic image pickup system according to claim 1, wherein said stereoscopic image pickup system is a lens unit capable of being detachably attached to a camera unit having an image sensor.

11. A stereoscopic image pickup system according to claim 10, wherein said controller sends and receives information to and from a controller provided in the camera unit.

12. A stereoscopic image pickup system according to claim 1, further comprising an image sensor for converting light incident on said stereoscopic image pickup system into an electrical signal.

13. A stereoscopic image pickup system according to claim 12, wherein said controller includes a first controller provided in a lens side included in said stereoscopic image pickup system, and a second controller provided in a camera side included in said stereoscopic image pickup system, and wherein sending and receiving of information being performed between said first controller and said second controller.

14. A stereoscopic image pickup system according to claim 1, wherein said controller comprises a microcomputer.

15. A stereoscopic image pickup system according to claim 1, wherein the amount of parallax P of parallactic images at an initial stage satisfies the following equation:

$$P = \frac{2 \cdot S \cdot f \cdot I \cdot (H - F)}{C \cdot (I^2 + F \cdot H)}$$

wherein H is the object distance, F is the convergence distance, f is the focal length, I is half of the mirror interval, S is the width of a display screen, and C is the length of a longer side of a CCD.

* * * * *

UNITED STATES PATENT AND TRADEMARK OFFICE
CERTIFICATE OF CORRECTION

PATENT NO. : 6,862,140 B2
DATED : March 1, 2005
INVENTOR(S) : Shigero Ogino

It is certified that error appears in the above-identified patent and that said Letters Patent is hereby corrected as shown below:

Column 6,
Line 38, "length) is," should read -- length), --.

Column 7,
Line 14, "numeral 101," should read -- numerals 101, --; and
Line 15, "numeral 102" should read -- numerals 102 --.

Column 15,
Line 4, "in" should read -- In --; and
Line 54, "had better not" should read -- should not --.

Column 16,
Line 5, "equalt" should read -- equal --.

Column 17,
Line 28, "optical member" should read -- combining optical member, --.

Signed and Sealed this

Thirtieth Day of August, 2005

JON W. DUDAS
*Director of the United States Patent and Trademark Office*